Feb. 14, 1933.     G. E. HULSE     1,897,980
HEATER CONTROL SYSTEM
Filed April 16, 1928     5 Sheets-Sheet 3

Feb. 14, 1933.  G. E. HULSE  1,897,980
HEATER CONTROL SYSTEM
Filed April 16, 1928   5 Sheets-Sheet 5

Inventor
George E. Hulse
By Watson, Coit, Morse & Grindle
Attorneys

Patented Feb. 14, 1933

1,897,980

UNITED STATES PATENT OFFICE

GEORGE E. HULSE, OF NEW HAVEN, CONNECTICUT, ASSIGNOR, BY MESNE ASSIGNMENTS, TO THE SAFETY CAR HEATING AND LIGHTING COMPANY, OF NEW HAVEN, CONNECTICUT, A CORPORATION OF NEW JERSEY

HEATER CONTROL SYSTEM

Application filed April 16, 1928. Serial No. 270,488.

This invention relates to a heater control system and apparatus and more particularly to a system in which one or more heaters are arranged to be intermittently operated, and in which means are provided for arranging a definite interval between successive operations of the heaters, and further means are provided for interrupting and extending this definite interval without affecting the fixed interval during which the heaters are in operation.

Although the invention is of general application it is particularly intended for use in connection with adsorption type refrigeration systems in which heat is intermittently supplied to one or more adsorber units. When used in conjunction with such a refrigerating system, the main objects and features of the invention are as follows:

1. To provide a definite period for operating the heater associated with each adsorber while providing a fixed minimum and indefinite maximum period of time between the operations of the heaters or between successive operations of a single heater.

2. To control the interval between successive heatings of the same heater or consecutive heatings of separate heaters in accordance with the required amount of heat.

3. The provision of a motor, operated from the source of energy supply for the heaters, for determining the fixed heating periods and the minimum idle periods.

4. The provision of means, controlled by the motor, for stopping the normally constant operation of the motor before it reaches a position to actuate means for starting a heater.

5. The use of a thermostat to restart the motor after it stops itself.

6. The arrangement of a single pilot burner adapted to ignite gas at any one of a plurality of main burners.

7. The provision of means whereby the extinguishing of the pilot light automatically stops the flow of fuel to all of the main burners, to the pilot light and to the timing mechanism.

8. The provision of gas-operated relay valves for controlling the individual burners.

9. The provision of a novel form of gas-operated motor for actuating the valve controls, and 10. The provision of novel valves and valve assemblies for carrying out the above objects and features.

Other and further objects and features of the invention will be more apparent to those skilled in the art after a consideration of the accompanying drawings and following specification, wherein is disclosed a single exemplary embodiment of the invention. It is to be understood that various changes may be made in the invention, as disclosed, without departing from the spirit thereof so long as they remain within the scope of the appended claims.

The invention has been illustrated, in the particular embodiment herein described, as applied to a refrigerating system making use of two adsorbers adapted to be alternately heated, although it is obvious that the system may be applied for the purpose of controlling the heating of any suitable device or devices and may be used in the arts and industries as desired. It is merely described in conjunction with the refrigeration system for convenience.

Figure 1:
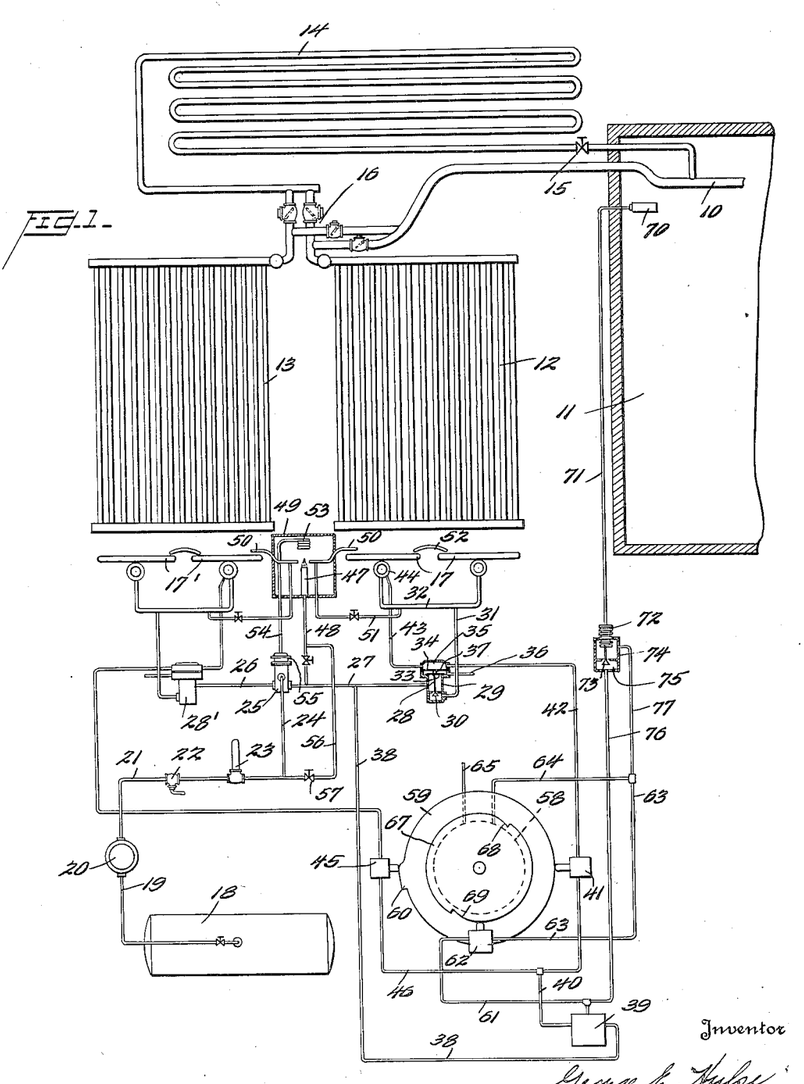
Fig. 1 is a schematic and diagrammatic showing of the invention as applied to an adsorption refrigeration system in which the adsorbers are preferably heated by a suitable gas.

The refrigeration system which is disclosed schematically in Fig. 1 is of the type wherein a liquid is evaporated in an evaporator 10 housed within the space or compartment 11 which it is desired to cool, and the vapor from the liquid is adsorbed in one or more adsorbers, such as 12 and 13, containing a suitable active adsorbent which will adsorb the vapors from the liquid in the evaporator 10 with such rapidity as to cause the required amount of cooling. When the adsorbent in one of the adsorbers becomes saturated with vapor, it must be heated to drive off the vapor, and this heating is known as "activiting." The vapor is driven into a suitable condenser 14, and after being there liquefied, is returned through the valve 15 to the evaporator.

It can readily be determined how much refrigeration is ordinarily required to cool the space 11, and the maximum refrigeration ever required can be likewise determined. This maximum refrigeration will require a certain number of cycles of operation, i. e., of adsorption and activation per day. Since the quantity of liquid required to saturate the material in each adsorber is a constant, it is evident that after saturation, a definite period of heating will be required to free the adsorbent material of this liquid or of that portion of the liquid which can be efficiently removed. Since the time necessary for cooling the adsorber after activation is considerable, before it is effective to again adsorb, it is often desirable to use a plurality of adsorbers which will be activated successively. In the present case, two adsorbers are shown adapted to be alternately activated, and they are connected to the evaporator 10 and the condenser 14 through the system of check valves and piping 16, which prevents the flow of vapor, driven off by activation, from one adsorber into the other or into the evaporator while yet allowing each adsorber to automatically connect itself to the evaporator when suitably cooled, and to the condenser when heated.

Each adsorber is adapted to be heated, as shown in the present instance, by one or more gas burners 17—17'. Gas to operate these burners may conveniently be obtained from any suitable source, here shown as a drum or tank 18 of gas such as propane which may be in the liquid state due to pressure. It passes through pipe 19, through the reducing valve 20, which changes the pressure to that desired for the burners and insures a gaseous condition of the fuel, thence through the pipe 21, the manual cut-off valve 22, the strainer 23, pipe 24, to the safety or pilot controlled valve 25, from whence it is distributed by means of the pipes 26 and 27 to the burner valves 28—28' which are of identical structure, so that but one need be described here. Referring to the right-hand valve 28, shown schematically in Fig. 1, it will be seen that it comprises a casing 29 to which gas is supplied by means of the pipe 27. A poppet valve 30 at the lower end affords communication from the central chamber to the lower chamber which is connected by means of the pipe 31 to the supply pipe 32 leading to the two burners 17 under the adsorber 12. Obviously, one or any desired number of burners may be connected to the pipe 32. The poppet valve 30 is normally retained against its seat by means of the spring diaphragm 33 which closes the upper end of the casing 29. Spaced above this diaphragm 33, which really comprises a packing for the valve stem, is the diaphragm 34 forming a closure for the chamber 35 arranged above the valve casing 29. The space between the diaphragms is connected to the atmosphere by means of the pipe 36. It will be obvious that a pressure in the chamber 35 greater than that of the atmosphere will cause a flexing of the diaphragm 34 which operates through the stud 37 to flex the diaphragm 33 and thus open the poppet valve and permit gas to flow from the tank 18 to the burners 17 beneath the adsorber 12.

Gas is supplied from the tank 18 to the chamber 35 as follows:

From the pipe 27, through the pipe 38, the strainer 39, the pipe 40, the valve 41, and the pipe 42. In order that the valve 30 may close when the supply of gas is cut off at the valve 41, a small bleeder outlet 43 is provided for the chamber 35. In order to consume the gas which leaks through this bleeder when there is pressure in the compartment 35, the pipe 43 may lead into the mixing valve 44 of one of the burners 17, as shown. The valve for the burners beneath the adsorber 13 is controlled in a similar manner by means of the valve 45 connected by means of the pipe 46 to the pipe 40.

In order to ignite the gas which issues from the burners 17 when either valve 28 or 28' is caused to open by a suitable operation of the valves 41 and 45, a main or central pilot burner 47 is provided midway between the burners 17 beneath the two adsorbers. This pilot may be supplied with gas through the pipe 48 from the pipe 27 on the far side of the safety valve 25 and is intended to burn at all times while the refrigerating device is in operation. It is conveniently enclosed within the perforated housing 49 to protect it from draughts. A jumper or secondary pilot 50 leads from this pilot burner 47 to the nearest burner 17 under each adsorber. The jumper comprises a perforated tube with open ends, one in proximity to the pilot flame and the other to the gas ports in the burner. Gas may be supplied to the jumper from its respective burner supply pipe 32 by means of the pipe 51. It will be seen that, when gas is admitted to the burner pipe 32 after the operation of the various valves previously described, a small quantity will flow through the pipe 51 and into the jumper tube to be ignited from the pilot flame. Gas issuing through the lateral openings in the jumper tube will cause successive flames to run along the outer surface of the jumper tube, and thus, flames near the outer end of the jumper will ignite the gas issuing from the burner 17. A second jumper 52 is shown connecting the two burners beneath each adsorber.

In case of a stoppage of gas flow for any reason, such as the exhaustion of the gas in the tank 18, it is desirable that all gas valves be closed. Further, it is particularly desirable that the gas valves leading to the burners be immediately closed in case the pilot flame is extinguished either accidentally or intentionally. This is accomplished by the safety valve 25, which is normally biased to a closed position to prevent flow of gas from the pipe 24 to the pipes 26 and 27. This valve is operatively connected to the thermo-responsive coil 53, which is arranged in proximity to the pilot flame, by means of the tubing 54 in such a manner that the expansion of a suitable fluid enclosed in the coil 53 and tubing will transmit a pressure to a sylphon bellows 55 arranged on the top of the safety valve, and cause the valve to be held open. It will be retained open as long as the coil 53 is heated by the pilot flame, but will close shortly after the flame is extinguished by the cooling of the liquid and its consequent contraction. In order to provide for lighting the pilot burner which is preferably supplied with gas from beyond the safety valve a by-pass pipe 56 is provided around the safety valve leading to the pilot burner, and is provided with a manually controlled valve 57 which can be opened to light the pilot burner and can be closed as soon as the coil 53 has been sufficiently heated to open the safety valve.

As before stated, the period of time during which a burner must be lighted to activate the material in the adsorber can be readily computed. At the same time, the maximum number of activations per day ever required can be computed. It is therefore easy to determine how long each burner should be lighted and the minimum interval of time between such lightings. It is desired to light and extinguish the burners automatically, and this may be done by the mechanism shown in the lower right-hand corner of Fig. 1. It comprises any suitable motor 58 of which a gas operated type is shown in detail in the remaining figures and will be further described later. This motor is adapted to be driven at a slow rate of speed by means of the gas used as fuel for the burners. It drives, through suitable mechanism, a cam disk 59 carrying the cam 60 which is adapted to successively cooperate with the valves 41 and 45 previously described. It extends through such a portion of the periphery of the cam disk as to open the valve 41 or 45 for the period necessary for activating an adsorber. For this purpose, the speed of the motor should be substantially constant and the speed of the cam disk quite slow. It will thus be seen that the same definite period of activation is allotted to each adsorber.

If the motor ran continuously at the definite speed previously determined, then it is obvious that the interval between activations of the adsorbers 12 and 13, and in fact between successive activations of the same adsorber, would be definite and would bear a definite ratio to the period of activation. Thus, there would be a definite ratio between the adsorption period and the activation period. The adsorption period would be that minimum period above referred to, during which the adsorber could be saturated, perhaps due to extreme temperatures outside of the compartment 11. However, under normal operation and with reduced outside temperatures, this period of adsorption can be materially extended and may be followed by an idle period of the adsorber while remaining connected to the evaporator. The period between the activations of the two adsorbers should then not be a constant but should be determined by the temperature within the compartment 11.

Means to cause a variation in the interval between activations comprises means for stopping the rotation of the motor 58 just before the cam 60 engages one of the valves 41 or 45, and thermostatic means for again starting the motor.

Gas to operate the motor is taken from the tank 18 by way of the strainer 39 and the pipe 61 which leads to the valve 62 mounted adjacent the cam disk 59 from whence the gas passes through the pipes 63 and 64 to the driving mechanism of the motor and may be exhausted when used through the pipe 65. Any suitable disposition of the exhaust gas may be made. The valve 62 cooperates with the cam 67 which has two low spots 68 and 69 which allow the valve 62 to close. These low spots are of short arc, and at all other times the valve 62 is open so that the motor can run at constant speed for substantially a half revolution in the case where two adsorbers are used, and will then be stopped by one of the low spots allowing the valve 62 to close. The valve 62 closes just before the cam 60 engages one of the valves 41 or 45 or, in other words, just before an adsorber is to be activated. The motor may thus be said to control its own stopping but is unable to start again since further rotation of the motor is required to open the valve 62. This further rotation, when necessary, is initiated by a thermostatic element 70 arranged within the cooled space 11. A suitable expansible fluid in the element 70 operates through the pipe 71 and the sylphon 72 to open the poppet valve 73 in the casing 74 when the temperature in the space 11 rises above a predetermined value which may be adjusted to suit conditions within the cooled space. The casing 74 is supplied with gas in its lower compartment 75 by means of the pipe 76 leading directly from the strainer 39. The valve 73 is normally closed when the temperature within the space 11 is sufficiently low. If the temperature within the space 11 becomes too high, the valve 73 will be opened, and gas will be supplied through the pipe 77, and the pipe 64 to the motor 58 to start the same. If the motor stops, due to the action of the valve 62, and the temperature is sufficiently low within the compartment 11, no heating of the adsorbers will take place, and in case the adsorbers are not saturated, the adsorption will continue.

When the temperature rises in the compartment 11, the operation of the thermostatic device 70 will cause the opening of the valve 73 and allow gas to flow to the motor, starting the same in operation and thus under the action of the cam 60 starting an activation period. The motor will run at its normal speed and will, at the end of the minimum interval of time, close the valve 62 due to the action of the cam 67, and the motor will then stop. However it will be noted that the motor is always constrained to operate, after once starting, for a one-half revolution of the cam disk irrespective of what takes place in the compartment 11. In other words, the minimum interval between activations will always be effective, being preceded by an idle interval in case the temperature in compartment 11 is sufficiently low.

It will be noted that all of the gas supplied to the motor and to the compartments 35 in the burner valves must come through the pipe 38 which is on the far side of the safety valve. It will thus be seen that in case the pilot flame is extinguished, not only will the burners be extinguished but the motor will stop operating, insuring that, upon the relighting of the pilot flame, operation of the whole system will resume from the point where it left off. This is of particular importance since the activation period is so much shorter than the period between successive activations. With properly designed apparatus, it may be found that there are only from six to twelve activations per day with average atmospheric temperatures.

In commercial applications of the apparatus just described, it may be found convenient to combine all of the valves and the control motor into a single assembly which will be more rugged in construction than where the valves are separated by pipe lengths and which will eliminate a certain number of joints and thus tend to reduce the possibility of leakage. At the same time, a compact structure results which can be successfully housed for protection. Figures 2 to 8 inclusive show such a construction in which all of the parts are either formed integral with or supported upon a base member 100 which is preferably a suitable casting of brass or similar metal taking the form of a thick plate of rectangular configuration, as seen in Figure 4. On the lower side of this plate is the depending rib portion 101 extending substantially the length of the plate and including the longitudinal gas passage 102, the burner valve bases 103, 103', the safety valve base 104 and the burner pipe sockets 105, 105'. To the top of the plate or base is secured the motor and its associated valves generally indicated by the reference character 106 and beside this motor is the thermostat control valve 107 which regulates the length of the idle period of the motor in accordance with the temperature within the refrigerated compartment, as previously described.

To the front face of the depending rib 101 on the base plate is secured a casting 108 which includes the main body portions 109, 109' of the burner valves and the main body portion 110 of the safety valve. Gas is adapted to be supplied to the unit from the pipe 111 which leads into the boss 112 having a passage 113 into the base portion of the safety valve. Secured to the upper end of the main portion 110 of the safety valve is the valve actuating diaphragm 114 held in position between the body 110 and the cap 115 secured thereto. This diaphragm acts through the stud 116 onto the end of the valve stem 117 which carries the poppet valve 118 seating at 119 to isolate the chamber in the base of the valve from that in the main body part when the valve is closed under the action of the spring 120 surrounding a stud in the base and pressing against the lower end of the stem 117 where it projects below the valve 118. A packing diaphragm 121 maintains the compartment, below the diaphragm 114, which is open to the atmosphere, isolated from the compartment in the main body of the valve. Gas entering through passage 113 into the compartment in the base of the valve can, when the valve is open, pass into the body of the valve and thence through the angled passage 122 into the passageway 102 and thus gain access to the base compartments of the two burner valves 103, 103'.

Each of the burner valves is constructed so that it is substantially identical with the safety valve just described and it will not be necessary to go into detail as to the construction and arrangement of the parts. It will be sufficient to state that as shown in Figures 3 and 4, the compartment in the base portion of the valve is in communication with the passage 102 and that in the body portion of the valve communicates through a passage 123 with the outlet 124 to which the pipe 125 which leads directly to the burner may be connected.

The safety valve is, of course, adapted to be operated as previously described for which purpose the pipe 54 shown in Figure 1 leading from the coil 53 is shown connected to the center portion of the cap 115 in which may be housed a suitable bellows arrangement, or the expanding liquid may act directly on the upper surface of the diaphragm 114. Gas for the pilot burner 47 is taken off from the boss 112, adjacent to where the pipe 111 enters, through a needle valve controlled by the screw 126 from whence it passes to the pipe 127 leading to the pilot burner.

Figure 2:
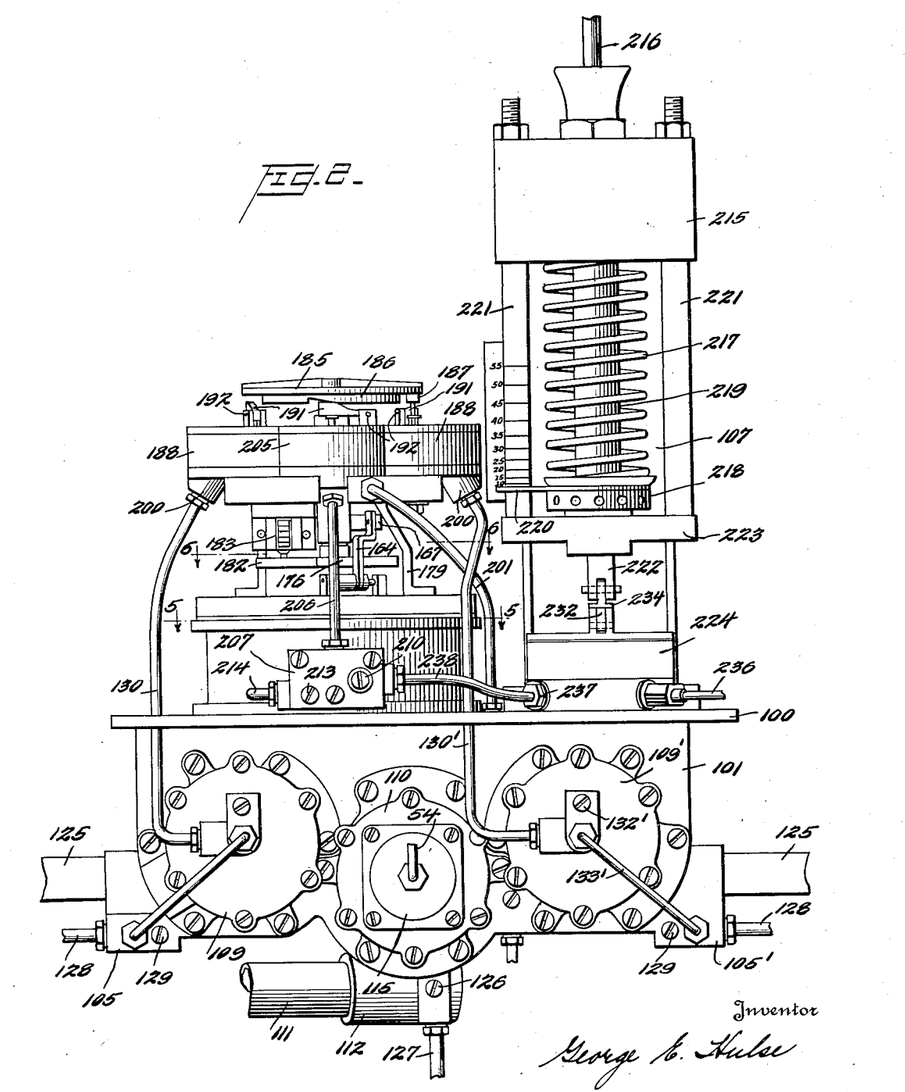
Fig. 2 is an elevation of the control mechanism assembly.
Figure 3:
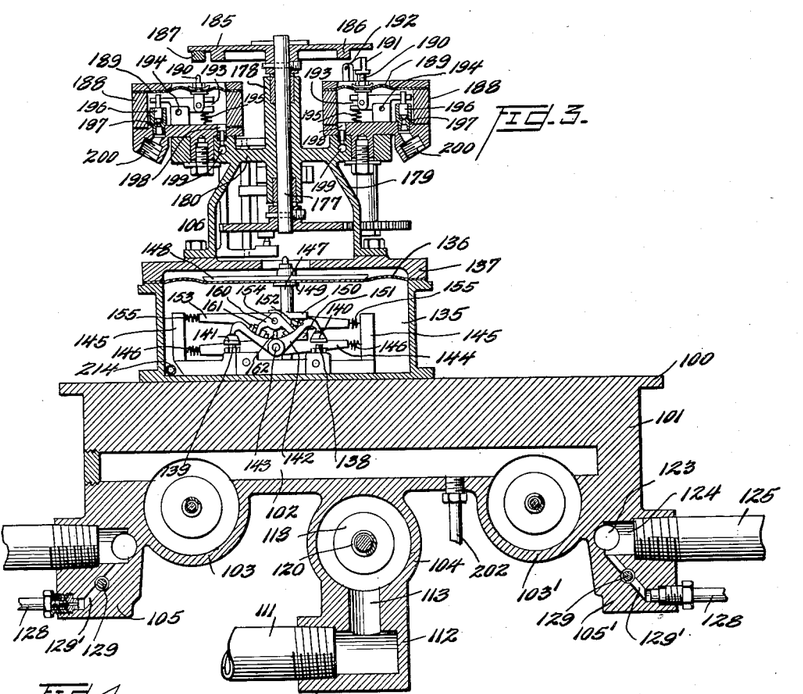
Fig. 3 is a vertical section thereof on the center line of the motor and on line 3—3 of Fig. 4.
Figure 4:
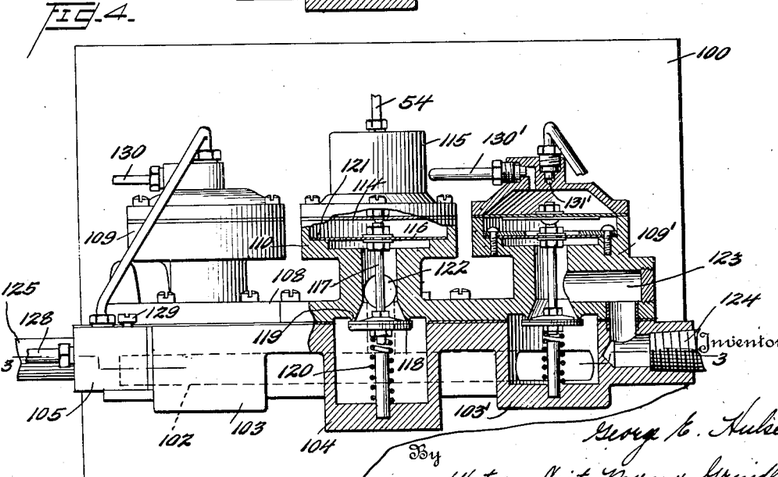
Fig. 4 is a bottom view thereof, certain of the valves being shown in horizontal central section.
Figure 5:
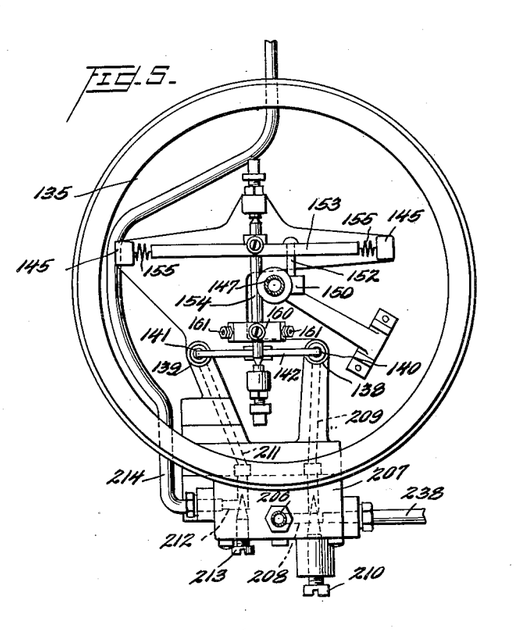
Fig. 5 is a horizontal section through the motor on line 5—5 of Fig. 2.
Figure 6:
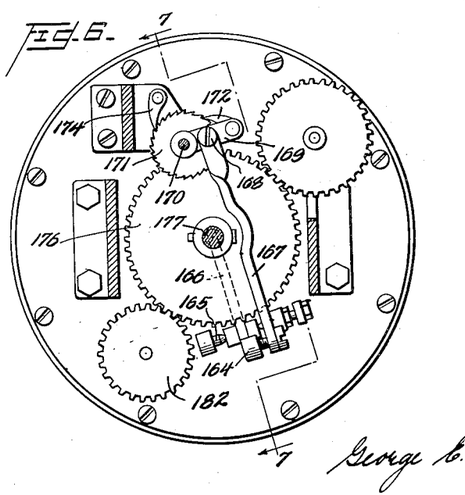
Fig. 6 is a horizontal section through the motor on line 6—6 of Fig. 2.
Figure 7:
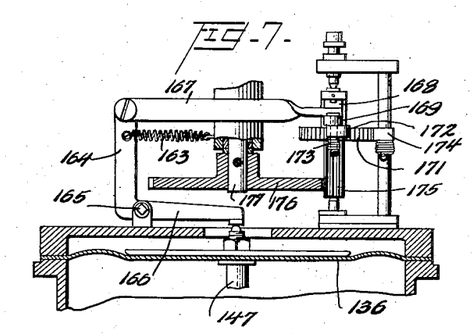
Fig. 7 is a vertical central section through part of the motor taken on line 7—7 of Fig. 6.
Figure 8:
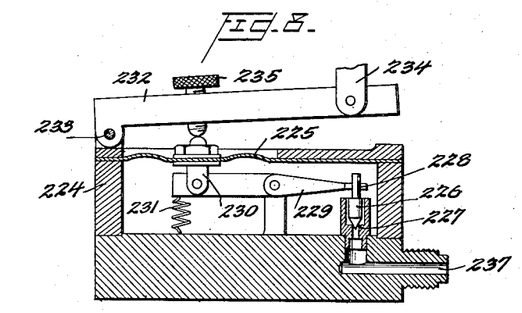
Fig. 8 is a section through the thermostatically controlled valve.

Each jumper 50, 50' is supplied with gas from its respective burner valve by means of a pipe such as 128 shown in Figures 2 and 3 which receives its gas through a suitable needle valve 129 in the passage 129' leading to the outlet passage 124 from the burner valve. It is thus obvious that gas is supplied to the jumpers only when their respective burners are receiving gas. Gas to actuate the burner valves as previously described, is passed to the compartments above the actuating diaphragms thereof from motor controlled valves by way of the pipes or tubes 130, 130' which enter, as shown at the right hand side, of Figure 4, through bosses on the valve covers and have passages leading into the space above the diaphragms. It will be remembered that a suitable bleed or exhaust is provided for each compartment, above the diaphragm, in order that the valve may close under the action of its spring when the flow of gas through the pipe 130 ceases. This bleed passage is seen at 131' and is controlled in size by the needle valve 132' seen in Figure 2. The gas bled from the compartment passes through the pipe 133' and joins the gas supplied to the jumper on the jumper side of the needle valve 129 which regulates the normal flow of gas to the jumper. The quantity of bled gas would be insufficient to operate the jumper and is therefore augmented by the supply controlled by the needle valve previously described. The description of the parts below the base plate 100 is now completed.

The motor for operating the small valves which control the burner valves and thus for timing the activations of the adsorbers comprises a main chamber 135 in a casting preferably circular in plan and having a flexible diaphragm 136 secured across the open upper end thereof by means of the cover plate 137 suitably fastened to a flange on the upper side of the motor casting. The main chamber casting of the motor is secured to the base plate 100 in any suitable manner.

Within the motor chamber is a gas inlet port 138 and a gas exhaust port 139 and controlling these ports are the valves 140 and 141 mounted on opposite ends of a rocker 142 secured to the horizontal shaft 143. Thus either valve may be closed whereupon the other will be open. The lever 144 is fixed fast to the same shaft 143 as the valve rocker 142 and has between its ends and the vertical abutments 145 the compression coil springs 146 arranged so that when the arm 144 passes dead center, that is, passes beyond the position where the springs are in axial alignment, they snap it to its limit of movement fixed by the seating of one of the valves. This insures a snap action for the valves 140 and 141 and prevents them both remaining open at the same time.

The diaphragm 136 carries the diaphragm post 147 which is secured thereto by means of the disks 148 and 149 on opposite sides of the diaphragm. This large disk 148 prevents canting of the post. Extending laterally from post 147 and within the compartment are the vertically spaced arms 150 and 151 adapted alternately to engage the pin 152 on the lever 153 which is mounted on the shaft 154 best shown in Figure 5. This shaft is parallel to and above the shaft 143 carrying the valve rocker. The lever 153 is provided with springs 155 which cause it to function in the same manner as the lever 144. When the diaphragm is lifted by the gas entering through valve port 138, the lateral arm 151 engages beneath the pin 152 and causes the lever 153 to snap from the position shown in Figure 3 to the opposite position. In so doing the shaft 154 is rocked and with it the lever 160 carrying at its ends the adjusting screws 161 and causing the left hand one, as viewed in Figure 3, to engage with the projection 162 on a collar on the shaft 143 and cause this shaft to snap over and close the inlet valve under the action of the spring controlled lever 144, as previously described. This causes the opening of the exhaust valve and the gas escapes allowing the diaphragm to lower until the lateral arm 150 engages the pin 152 and reverses the position of the valves in a manner similar to that just described in connection with opening the exhaust valve.

The expulsion of the gas from the motor compartment is effected under the action of a spring 163 (Fig. 7) which acts on the vertical arm 164 of a bell crank lever pivoted at 165 and having the horizontal arm 166 bearing on the upper end of the diaphragm post 147. A link 167 is pivoted to the upper end of the arm 164 and has its far end pivoted at 168 (Fig. 6) to the arm 169 pivoted about the vertical axle 170 about which the ratchet wheel 171 is adapted to rotate. The arm 169 carries at its outer end the pawl 172 pressed into engagement with the ratchet wheel by the spring 173. Oscillation of the arm 169 will drive the ratchet wheel counter-clockwise as viewed in Figure 6. A conventional non-return pawl 174 is provided to prevent the pawl 172 from dragging the ratchet wheel back on its return stroke. It will thus be seen that the vertical reciprocating action of the diaphragm is converted into intermittent rotary motion at the ratchet wheel 171 which is formed integral with the pinion 175 which drives the gear 176 mounted on the central shaft 177 of the motor. The elongated bearing supporting sleeve 178 for this central shaft is supported by the spider 179 carried by the cover plate 137 and having a circular central portion 180 which supports the valves later to be described. If desired, a gear 182 may be driven from the large central gear 176 in order to drive the countermechanism 183 shown in Figure 2 and serving to count the number of rotations of the axle 177.

It will be remembered that a cam disk is actuated by the motor and in the construction now being described this disk is illustrated at 185 at the top of the axle 177. It is provided on its under surface with the annular cam ridge 186 having two interruptions corresponding to 68 and 69 in the diagrammatic showing of Figure 1. A block 187 is adjustably secured to the under face of the cam disk and corresponds to the projection 60 of Figure 1, serving to actuate alternately the two valves which control the flow of gas to the burner valve diaphragms. Mounted on the center portion 180 of the spider 179 are three valve housings 188, all of the same construction, two being arranged diametrically opposite to each other and corresponding to the valves 41 and 45 of Figure 1 and the third suitably between these two and corresponding to valve 62 of Figure 1. The two spaced 180° apart are the burner control valves and the third is the valve which controls the stopping of the motor. The burner control valves are adapted to be operated by the block 187 while the motor control valve cooperates with the cam ridge 186. Each valve has its compartment closed at the top by a diaphragm 189 provided with a diaphragm post 190, the upper end of which cooperates with the under surface of a cam follower 191 pivoted at 192 to the cover plate of the valve housing. The upper surface of this follower cooperates with the proper cam on the cam disk 185. The inner end of the post 190 is provided with a pin which cooperates with the walls of a slot 193 in the valve operating rocket pivoted at 194. Between the bottom of the casing and the slotted end of the rocker is a spring 195 normally maintaining the diaphragm in a raised position assisted by the gas pressure. A valve member 196 is pivoted to the opposite end of the valve rocker and cooperates with a seat 197 with which it is normally maintained in engagement under the action of the spring 195. All three valves are supplied with gas to the interior of their respective compartments by the passages 198 leading from the circular manifold 199 in the part 180 and each has an outlet 200.

Gas is supplied to the manifold 199 through the pipe 201 shown in Figure 2 which connects with a manifold (not shown) in the base plate which receives gas from the gas passage 102 therein through the pipe 202 shown in Figures 2 and 3. It will be seen that when the cam block 187 engages and opens one of the pair of similar valves which cooperate with the burner valves, gas will be permitted to flow out of the corresponding outlet 200 and through one of the pipes 130 or 130' to the respective burner valve for operating the same. Gas to drive the motor may pass from its control valve shown at 205 in Figure 2, through the pipe 206 into the block 207 which forms part of the main casing casting of the motor. This pipe 206 enters at the top of the block and communicates with a passage 208 in communication with the passage 209 leading to the outlet port 138 controlled by the valve 140 in the motor. A needle valve 210 regulates the flow between the passages 208 and 209 to control the speed of the motor. The exhaust gas from the motor passes through the port 139 into the passage 211 in the block 207 and thence to the passage 212 under control of the needle valve 213 to further assist in regulating the speed of the motor and then out through the exhaust pipe 214.

The valve shown in Figure 1 as 74 for starting the motor after it has been stopped under the action of its own control valve, is shown in Figure 2 as 107, mounted on the base plate beside the motor. It comprises a sylphon bellows within the casing 215 having a tube 216 in communication therewith which leads to the temperature responsive element in the cooled compartment. The bellows is, of course, subject to changes in length in accordance with the change in volume of the liquid in the temperature responsive means. A spring 217 opposes the expansion of the sylphon bellows and its tension may be adjusted by the regulating nut 218 operating on the hollow threaded post 219. A pointer 220 between the end of the spring and the nut cooperates with a graduated scale on one of the supporting posts 221 of the whole valve arrangement in order that the temperature at which the valve will operate may be determined. The pointer may be bifurcated to engage over the post to prevent rotation. Within the post 219 is the rod 222 connected at its upper end to the sylphon and guided at its lower end in the disk 223. The valve proper is contained within the housing 224 best shown in Figure 8 and having the flexible diaphragm 225 closing the upper end thereof. The valve member 226 cooperates with the seat 227 and is pivoted at 228 to the lever 229 pivoted at its center and having connection to the diaphragm post 230 at its opposite end. A spring 231 tends to maintain the valve closed at all times, and to distend the diaphragm. A lever 232 pivoted at 233 to the cover of the valve casing has connection by means of the link 234 with the rod 222 and an adjusting screw 235 passes through this lever 232 and engages with the upper end of the diaphragm post 230 so that downward movement of the rod 222 under the action of the sylphon effects opening of the valve 226. It is closed by the spring and the action of gas on the diaphragm when the rod 222 is lifted. Gas is admitted to the compartment 224 through the pipe 236 which is connected to the manifold in the base plate from which the pipe 201 receives its gas supply. The outlet 237 from the valve communicates by means of the pipe 238 with the block 207 where it leads into the passage 209, as clearly illustrated in Figure 5. Thus gas from the valve 226 may operate the motor, under control of the valve 210. If both the motor control valve 205 and the thermostat valve 226 should be open at the same time, the valve 210 would thus maintain the speed of the motor constant.

Having thus described the invention, what is claimed as new and desired to be secured by Letters Patent is:

1. In a control system of the type described, in combination, a source of fuel, a fuel burner, a pipe from said source to said burner, a valve in said pipe and a separate fuel flow actuated means to directly and intermittently actuate said valve in direct relation to the speed of the said means.

2. In a control system of the type described, in combination, a source of fuel, a fuel burner, a pipe from said source to said burner, a valve in said pipe normally spring pressed closed, a pressure operated means to open said valve, a fuel driven motor and means actuated by said motor to intermittently supply fuel from said source to said pressure operated means.

3. A control mechanism including in combination, a motor adapted to be driven at substantially constant speed by gas under pressure, a normally open valve in the gas supply pipe to said motor, means actuated by said motor to close said valve after a predetermined number of cycles of operation of said motor, a by-pass around said valve and means independent of said motor and gas supply to permit the flow of gas through said by-pass.

4. A control mechanism including in combination, a motor adapted to be driven at substantially constant speed by gas under pressure, a normally open valve in the gas supply pipe to said motor, means actuated by said motor to close said valve after a predetermined number of cycles of operation of said motor, a by-pass around said valve and temperature controlled means to regulate the flow of gas through said by-pass.

5. A heater control mechanism including in combination, a motor adapted to be driven by a source of power, means actuated by said motor to cut off said source of power after each predetermined number of cycles of operation of said motor and means independent of said motor to re-establish connection of said power and motor upon the occurrence of a predetermined condition.

6. A heater control mechanism including in combination, a motor adapted to be driven by a source of power, means actuated by said motor to cut off said source of power after each predetermined number of cycles of operation of said motor, means independent of said motor to re-establish connection of said power and motor upon the occurrence of a predetermined condition, said motor actuated means then maintaining said connection until the completion of the next said predetermined number of cycles of operation of said motor.

7. A heater control mechanism including in combination, a motor adapted to be driven by a source of power, a cam disc driven at a slow speed by said motor, a heater control means adapted to be actuated by a cam on said disc, means to control the power flow to said motor, a cam on said disc to cooperate with said means to stop the operation of said motor prior to the actuation of said heater control means by said first mentioned cam and temperature controlled means adapted to re-establish the supply of power to said motor when said second mentioned cam has stopped said motor.

8. A heater control mechanism including in combination, a motor adapted to be driven by a source of power, a cam disc driven by said motor, a plurality of heater control means adapted to be actuated successively by a cam on said disc, a cutoff for the power flow to said motor, means driven by said motor to actuate said cutoff prior to the actuation of each heater control means by said cam to thereby stop said motor and means dependent upon a predetermined condition to by-pass said cutoff and restart said motor.

9. A control mechanism for heaters including in combination, a plurality of burners, a source of gaseous fuel under pressure, a pipe connecting each burner to said source of fuel supply, a valve in each burner pipe, a motor driven by the expansion of said fuel, a valve in the fuel line of said motor, a cam disc driven by said motor, a cam thereon adapted to successively cause the opening and closing of each burner valve in rotation, a second cam on said disc adapted to close said motor fuel valve just before said first mentioned cam reaches a position to cause the opening of each burner valve, a thermostat, a by-pass around said motor fuel valve, and a normally closed valve in said by-pass, said valve in the by-pass being opened by said thermostat when the temperature exceeds a predetermined value.

10. A control mechanism for heaters including in combination, a plurality of burners, a source of gaseous fuel under pressure, a pipe connecting each burner to said source of fuel supply, a valve in each burner pipe, a motor driven by the expansion of said fuel, a valve in the fuel line of said motor, a cam driven by said motor, adapted to successively cause the opening and closing of said burner valves, a second cam adapted to close said motor fuel valve just before said first mentioned cam reaches a position to cause the opening of each burner valve, a thermostat, a by-pass around said motor fuel valve, a normally closed valve in said by-pass, said valve in the by-pass being opened by said thermostat when the temperature at a certain point exceeds a predetermined value, said motor driving said cams after being started by said thermostat so that the first mentioned cam opens and closes the adjacent burner valve, and continues to turn to a point just short of opening the second burner valve.

11. In a heating apparatus of the type described, in combination, a gas burner, a source of gas supply connected thereto, means to turn on and off the flow of gas to said burner, a continuously burning pilot burner connected to said gas source and adapted to ignite the gas at the main burner when it is turned on and means to cut off and to stop said means for turning on and off the flow of gas to said burner if the flame of said pilot burner is extinguished.

12. In a control unit for gas burners, in combination, a base having a conduit therein and an inlet, a plurality of individual valves carried by said base and communicating with said conduit, one of said valves being interposed between said inlet and said conduit, and outlets from the other valves.

13. In a control unit for gas burners, in combination, a base having a conduit therein, a plurality of individual valves carried by said base and communicating with said conduit, a gas inlet to said conduit controlled by one of said valves, a plurality of outlets from said conduit, each controlled by one valve and means carried by said base operated by gas to successively operate said outlet valves.

14. In a control unit for gas burners, in combination, a base having a conduit therein, a valve on said base to control the flow of gas to said conduit, a second valve on said base to control the flow of gas from said conduit, a gas driven motor on said base to intermittently open said second valve and a valve on said base adapted to be operated by a temperature responsive means, to control the operation of said motor.

15. A valve mechanism for fluid pressure operated motors, including in combination, a part having inlet and outlet ports, a valve for each port, a lever connecting said valves together so that but one can be open at a time, a snap mechanism for said lever insuring positioning of the valves at only full open and closed positions, a second snap action mechanism, a lost motion connection between said snap actions, means reciprocated by the movable part of said motor and a lost motion connection between said means and said second snap action.

16. In a control unit, in combination, a base plate, integral valve body parts on said plate, a second plate including seats for said valves and additional body parts adapted to cooperate with the respective body parts on said base plate, a conduit in said base plate providing communication between certain of said body parts thereon and means on said second plate placing a body part thereon in communication with said conduit.

17. In a control unit, in combination, a base plate, integral valve body parts on said plate, a second plate including seats for said valves and additional body parts adapted to cooperate with the respective body parts on said base plate, a conduit in said base plate providing communication between certain of said body parts thereon, means on said second plate placing a body part thereon in communication with said conduit, and operating means for each valve carried by said second plate.

18. A control mechanism for heaters including in combination a burner, a source of gaseous fuel under pressure, a pipe connecting said burner to the source of fuel, a valve in said pipe, a motor driven by the expansion of said fuel, a valve in the fuel line of said motor, a cam driven by said motor, adapted to cause the opening and closing of said burner valve, a second cam adapted to close said motor fuel valve prior to the engagement of the first mentioned cam with the burner valve, a bypass around said motor fuel valve, a normally closed valve in said bypass and a condition responsive means adapted to open said valve in the bypass.

19. In a heating system, in combination, a gaseous fuel burner, means to supply fuel to said burner for a definite period at recurring intervals, said means spacing said periods at minimum intervals, said means automatically extending said intervals, said means comprising a motor driven by the gaseous fuel and thermo-responsive mechanism to terminate said intervals.

20. In a valve control unit, in combination, a motor adapted to be operated at a constant speed by gas flow therethrough and having valves for its operation, a shaft rotated only by said motor at a reduced speed, a normally open valve in the gas supply line to said motor, means actuated by said shaft to close said valve at least once for each rotation of the shaft and means to actuate said motor to open said valve.

21. In a heating system, in combination, a gas burner, means to supply gas to said burner for a definite period and cut it off for a definite period, temperature controlled means to extend the cut-off period without altering the supply period, and a motor driven by the gas actuating said first means.

In testimony whereof I hereunto affix my signature.

GEORGE E. HULSE.